United States Patent
Montojo et al.

(10) Patent No.: US 8,780,944 B2
(45) Date of Patent: Jul. 15, 2014

(54) METHOD AND APPARATUS FOR RELIABLE SIGNALING IN WIRELESS COMMUNICATION

(75) Inventors: Juan Montojo, San Diego, CA (US); Hari Sankar, College Station, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1113 days.

(21) Appl. No.: 11/499,457

(22) Filed: Aug. 4, 2006

(65) Prior Publication Data

US 2007/0047499 A1  Mar. 1, 2007

Related U.S. Application Data

(60) Provisional application No. 60/711,987, filed on Aug. 26, 2005.

(51) Int. Cl.
*H04J 3/07* (2006.01)

(52) U.S. Cl.
USPC ........................................................ 370/506

(58) Field of Classification Search
USPC ................................................. 370/337, 335
See application file for complete search history.

(56) References Cited

U.S. PATENT DOCUMENTS

| | | | |
|---|---|---|---|
| 6,330,233 B1 | 12/2001 | Miya et al. | |
| 6,675,344 B1 | 1/2004 | Sharma | |
| 6,683,908 B1* | 1/2004 | Cleveland | 375/148 |
| 6,807,648 B1* | 10/2004 | Cansever et al. | 714/776 |
| 7,047,036 B2 | 5/2006 | Shaheen et al. | |
| 7,257,760 B2 | 8/2007 | Rick et al. | |
| 2003/0014456 A1* | 1/2003 | Nagata et al. | 708/517 |
| 2003/0063576 A1* | 4/2003 | DiFazio | 370/280 |
| 2003/0117980 A1* | 6/2003 | Kim et al. | 370/332 |
| 2004/0015750 A1 | 1/2004 | Obuchi et al. | |
| 2004/0120411 A1* | 6/2004 | Walton et al. | 375/260 |
| 2004/0125785 A1* | 7/2004 | DiFazio et al. | 370/348 |
| 2004/0216025 A1* | 10/2004 | Kim et al. | 714/755 |
| 2004/0223473 A1* | 11/2004 | Ha et al. | 370/335 |
| 2004/0233884 A1 | 11/2004 | Nishimura | |

(Continued)

FOREIGN PATENT DOCUMENTS

| | | |
|---|---|---|
| CN | 1551513 A | 12/2004 |
| CN | 1636419 A | 7/2005 |

(Continued)

OTHER PUBLICATIONS

Agin et al; TSG-RAB Working Group l(Radio) meeting #2; Feb. 22-25, 1999, p. 10.*

(Continued)

*Primary Examiner* — Mark Rinehart
*Assistant Examiner* — Christopher R Crompton
(74) *Attorney, Agent, or Firm* — Rupit M. Patel

(57) ABSTRACT

Techniques for improving reliability of signaling are described. A transmitter determines if improved reliability is applicable for signaling for a data frame. The transmitter sends the signaling without improved reliability if deemed not applicable and with improved reliability if deemed applicable. A receiver receives the signaling and declares the signaling as reliable or unreliable based on the received signal quality of the received frame and a threshold. The receiver recovers the signaling if deemed reliable and decodes the received frame in accordance with the recovered signaling. The receiver declares the received frame as a null frame or performs some other action if the signaling is deemed unreliable.

37 Claims, 11 Drawing Sheets

(56) References Cited

U.S. PATENT DOCUMENTS

| | | | |
|---|---|---|---|
| 2005/0018614 A1* | 1/2005 | Kiran | 370/252 |
| 2005/0083901 A1* | 4/2005 | Kim et al. | 370/342 |
| 2005/0163071 A1* | 7/2005 | Malladi et al. | 370/328 |
| 2006/0023628 A1* | 2/2006 | Uehara et al. | 370/232 |
| 2006/0093026 A1* | 5/2006 | Montojo et al. | 375/225 |
| 2006/0200710 A1* | 9/2006 | Webb et al. | 714/704 |
| 2008/0130608 A1* | 6/2008 | Hwang et al. | 370/342 |

FOREIGN PATENT DOCUMENTS

| | | |
|---|---|---|
| EP | 0893889 | 1/1999 |
| EP | 1443784 A1 | 8/2004 |
| JP | H1155219 A | 2/1999 |
| JP | H1198032 A | 4/1999 |
| JP | 200351807 | 2/2003 |
| JP | EP 1480365 | 11/2004 |
| JP | 2004356837 A | 12/2004 |
| KR | 20030094177 | 12/2003 |
| RU | 2134489 | 8/1999 |
| TW | 592418 | 6/2004 |
| WO | WO 9702667 | 1/1997 |
| WO | 0141349 A1 | 6/2001 |
| WO | WO 02052770 A1 | 7/2002 |
| WO | 02091591 A1 | 11/2002 |
| WO | WO 03030561 | 4/2003 |
| WO | WO 2004006613 | 1/2004 |
| WO | WO 2004049652 | 6/2004 |

OTHER PUBLICATIONS

ETSI Standards; "Universal Mobile Telecommunications System (UMTS); Physical Layer Procedures (TDD)"; ETSI Standards; Jun. 2001; pp. 13, 15, 19; XP014008518; ETSI TS 125 224 V4.1.0; European Telecommunications Standards Institute; Sophia-Antipolis, France.

International Search Report—PCT/US2006/033242, International Search Authority—European Patent Office—Mar. 20, 2007.

International Preliminary Report on Patentability—PCT/US2006/033242, International Search Authority, Geneva, Switzerland—Feb. 26, 2008.

Written Opinion—PCT/US2006/033242, International Search Authority—European Patent Office—Mar. 20, 2007.

3GPP TS 25.221 v6.4.1 (Jun. 2005), 3rd Generation Partnership Project; Technical Specification Group Radio Access Network; Physical channels and mapping of transport channels onto physical channels (TDD) (Release 6).

ETSI 3GPP TS 25.222 "3rd Generation Partnership Project; Technical Specification Group Radio Access Network; Multiplexing and channel coding (TDD)," Release Mar. 7, 2006.

Translation of Office Action in Korean application 10-2008-7007066 corresponding to U.S. Appl. No. 11/499,457, citing KR20030094177, WO04049652 and US20040233884 dated Mar. 24, 2011.

Translation of Office Action in Japan application 2008-528193 corresponding to U.S. Appl. No. 11/499,457, citing JP200456837, WO2002052770 and JP200351807 dated Jan. 18, 2011.

Bakhtiyari S, et al., "A Robust Type II Hybrid ARQ Scheme With Code Combining for Mobile Communications", New York, IEEE, US, IEEE Pacific Rim Conference on Computers and Signal Processing, May 19, 1993, vol. 1 of 2, p. 214-217, XP000409290.

European Search Report—EP10178904—Search Authority—The Hague—Oct. 3, 2012.

\* cited by examiner

US 8,780,944 B2

METHOD AND APPARATUS FOR RELIABLE SIGNALING IN WIRELESS COMMUNICATION

CLAIM OF PRIORITY UNDER 35 U.S.C. §119

The present Application for Patent claims priority to Provisional Application Ser. No. 60/711,987, entitled "METHOD AND APPARATUS FOR RELIABLE SIGNALING IN WIRELESS COMMUNICATIONS," filed Aug. 26, 2005, assigned to the assignee hereof, and expressly incorporated herein by reference.

BACKGROUND

I. Field

The present disclosure relates generally to communication, and more specifically to techniques for reliable signaling in wireless communication.

II. Background

In a communication system, a transmitter may receive data frames for transmission to a receiver. The transmitter may process (e.g., encode, interleave, and modulate) each data frame to generate data symbols and may multiplex signaling with the data symbols. The signaling may indicate the data rate and/or other information for the data frame. The transmitter then processes the multiplexed data symbols and signaling to generate a modulated signal and transmits this signal via a communication channel.

The receiver receives the transmitted signal and processes the received signal to obtain data symbol estimates, which are estimates of the data symbols sent by the transmitter. The receiver may also recover the signaling for each data frame and then process (e.g., demodulate, deinterleave, and decode) the data symbol estimates in accordance with the recovered signaling to obtain a decoded frame, which is an estimate of the data frame sent by the transmitter.

The receiver may need to correctly recover the signaling in order to properly process the data symbol estimates and obtain a correctly decoded frame. There is therefore a need in the art for techniques to achieve reliable signaling.

SUMMARY

According to one embodiment of the invention an apparatus comprises at least one processor to receive a frame comprising coded data and signaling, to determine received signal quality of the received frame, to determine whether the signaling is reliable based on the received signal quality, and if the signaling is deemed reliable, to recover the signaling and decode the coded data in accordance with the recovered signaling, and a memory coupled to the at least one processor.

Another embodiment includes a method comprising receiving a frame comprising coded data and signaling; determining received signal quality of the received frame; determining whether the signaling is reliable based on the received signal quality; and if the signaling is deemed reliable, recovering the signaling, and decoding the coded data in accordance with the recovered signaling.

Another embodiment includes an apparatus comprising means for receiving a frame comprising coded data and signaling; means for determining received signal quality of the received frame; means for determining whether the signaling is reliable based on the received signal quality; means for recovering the signaling if deemed reliable; and means for decoding the coded data in accordance with the recovered signaling if the signaling is deemed reliable.

Another embodiment includes a processor readable media for storing instructions operable to receive a frame comprising coded data and signaling; determine received signal quality of the received frame; determine whether the signaling is reliable based on the received signal quality; and if the signaling is deemed reliable, recover the signaling, and decode the coded data in accordance with the recovered signaling.

Another embodiment includes a method comprising determining if improved reliability is applicable for signaling for a data frame; sending the signaling without improved reliability if deemed not applicable; and sending the signaling with improved reliability if deemed applicable.

Another embodiment includes an apparatus comprising means for determining if improved reliability is applicable for signaling for a data frame; means for sending the signaling without improved reliability if deemed not applicable; and means for sending the signaling with improved reliability if deemed applicable.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
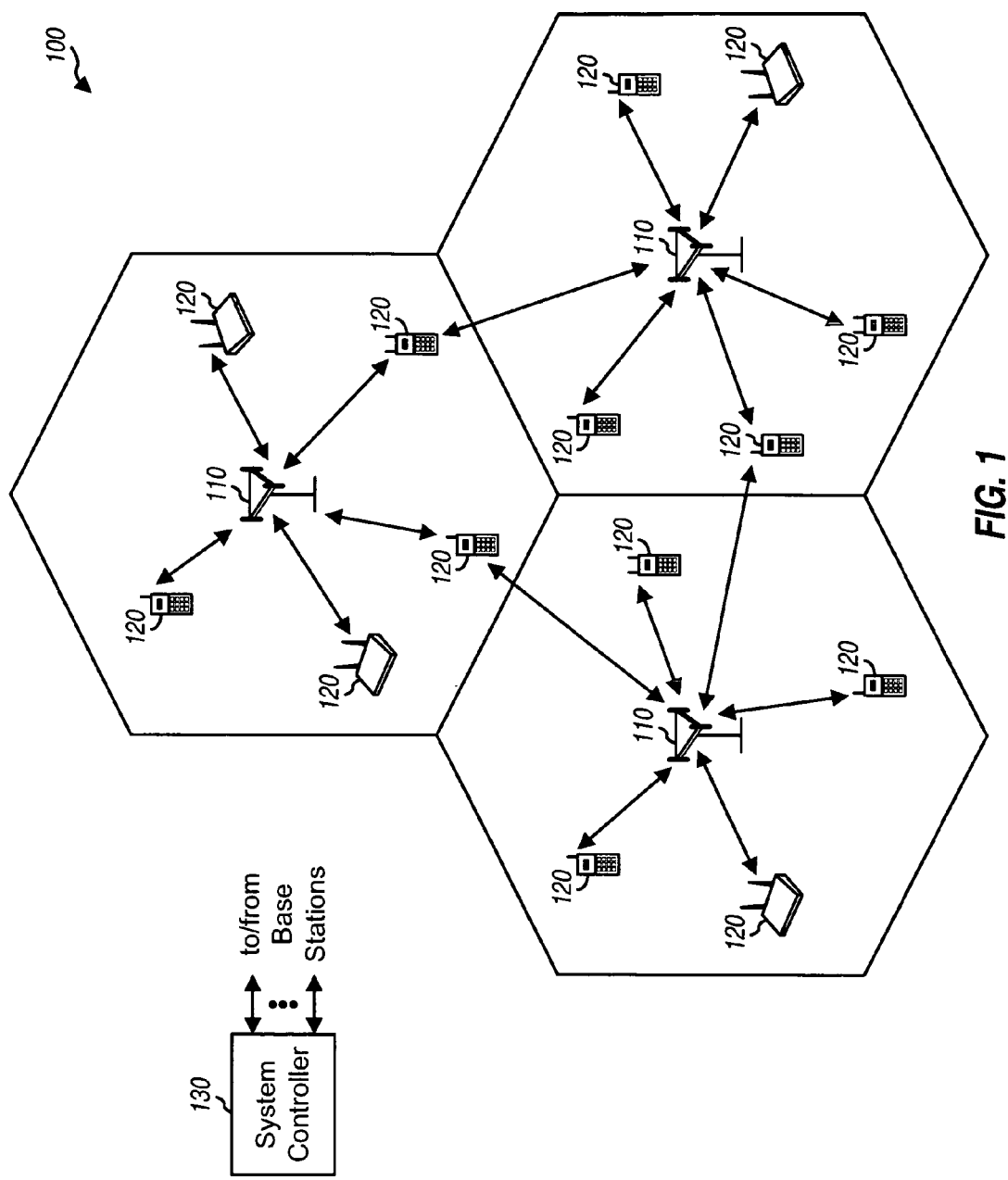
FIG. 1 shows a multiple-access communication system.

FIG. 1 shows a multiple-access communication system 100 with multiple base stations 110 and multiple terminals 120. A base station is generally a fixed station that communicates with the terminals and may also be called a Node B, an access point, or some other terminology. Each base station 110 provides communication coverage for a particular geographic area. A system controller 130 couples to base stations 110 and provides coordination and control for these base stations.

A terminal may be stationary or mobile and may also be called a user equipment, a mobile station, or some other terminology. A terminal may communicate with zero, one, or multiple base stations at any given moment. A terminal may be a cellular phone, a personal digital assistant (PDA), a subscriber unit, a wireless modem, a wireless device, and so on. In the following description, the terms "terminal" and "user" are used interchangeably.

The techniques described herein may be used for various wireless communication systems such as Code Division Multiple Access (CDMA) systems, Time Division Multiple Access (TDMA) systems, Frequency Division Multiple Access (FDMA) systems, and Orthogonal FDMA (OFDMA) systems. A CDMA system may implement a radio technology such as cdma2000, Universal Terrestrial Radio Access (UTRA) Time Division Duplex (TDD), or UTRA Frequency Division Duplex (FDD). cdma2000 covers IS-2000, IS-95 and IS-856 standards. UTRA TDD includes 1.28, 3.84 and 7.68 Mcps Options. UTRA TDD 3.84 and 7.68 Mcps Options are also referred to as Time Division CDMA (TD-CDMA) or High Chip Rate (HCR). UTRA TDD 1.28 Mcps Option is also referred to as Time Division Synchronous CDMA (TD-SCDMA) or Low Chip Rate (LCR). UTRA FDD is also referred to as Wideband-CDMA (W-CDMA). A TDMA system may implement a radio technology such as Global System for Mobile Communications (GSM). UTRA TDD, UTRA FDD and GSM are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, the techniques are described below for UTRA TDD LCR.

Figure 2:
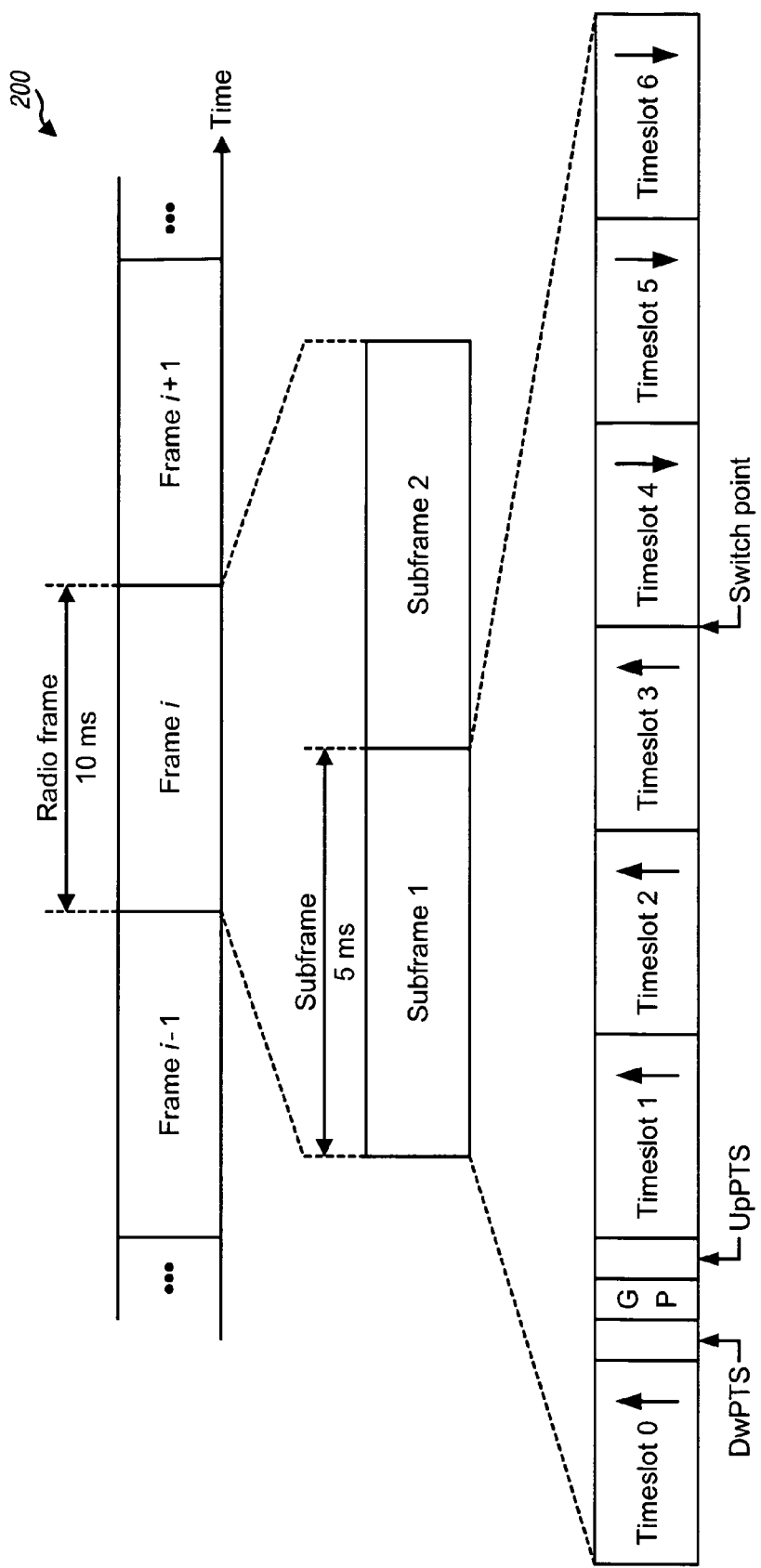
FIG. 2 shows a three-layer frame structure in UTRA TDD LCR.

FIG. 2 shows a three-layer frame structure 200 in UTRA TDD LCR. The transmission time line is partitioned into frames, with each frame being identified by a system frame number (SFN). Each frame has a duration of 10 milliseconds (ms) and is partitioned into two subframes 1 and 2. Each subframe has a duration of 5 ms and is partitioned into seven timeslots 0 through 6, a downlink pilot time slot (DwPTS), an uplink pilot time slot (UpPTS), and a guard period (GP). Timeslot 0 is used for the downlink, timeslot 1 is used for the uplink, and timeslots 2 through 6 may be used for the downlink and/or uplink, as determined by a switch point.

Each timeslot may be assigned to one or multiple users. A transmission for a user in a timeslot is referred to as a burst. A burst may carry traffic data, control data, TFCI, transmit power control (TPC), synchronization shift (SS), or a combination thereof. The TFCI indicates the data rate of a data frame. This data rate is associated with various parameters such as, e.g., a frame size, a code rate, a modulation scheme, etc. The TPC information is used for transmit power adjustment. The SS information is used for timing adjustment so that bursts from different terminals arrived aligned in time at a base station. Various burst formats are defined in UTRA TDD.

Figure 3:
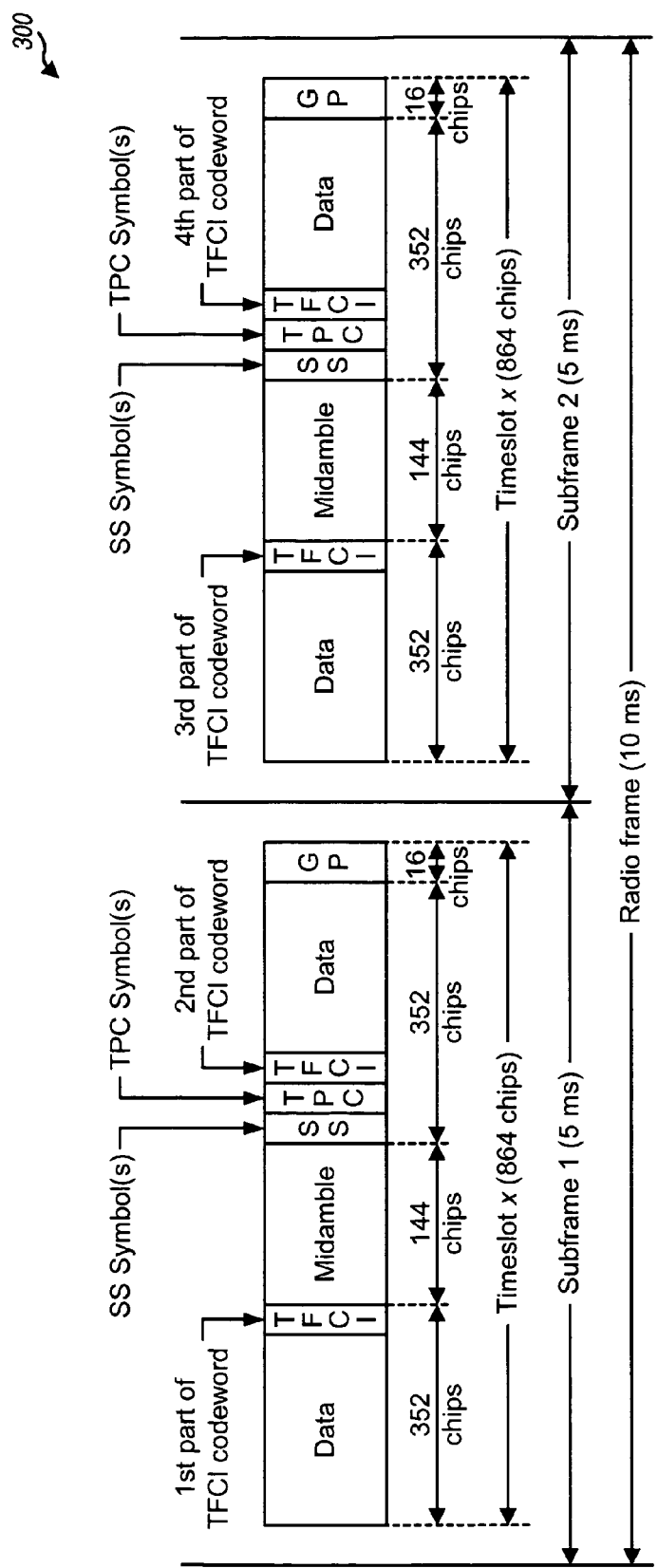
FIG. 3 shows a burst format in UTRA TDD LCR.

FIG. 3 shows a burst format 300 for the case in which a burst carries TFCI, TPC, and SS information. Burst format 300 may be used for the downlink and uplink. Burst format 300 covers two bursts to be sent in two timeslots, one timeslot in subframe 1 and another timeslot in subframe 2. Each burst includes a first data field, a midamble field, a second data field, and a guard period (GP). The four fields of each burst have the lengths (in chips) shown in FIG. 3.

The four data fields of the two bursts carry data symbols for a data frame. A TFCI code word is partitioned into four parts, which are mapped to the four data fields at the locations shown in FIG. 3. SS symbol(s) and TPC symbol(s) may also be mapped to the second data field of each burst at the locations shown in FIG. 3.

In UTRA TDD, the data symbols and TFCI symbols in a timeslot are spread with the same Walsh code. This Walsh code has a spreading factor of SF, which may be 1, 2, 4, 8 or 16. The spreading factor determines the number of times a given symbol is replicated and sent in the timeslot. The spreading factor is thus one factor that determines the reliability of the symbol. Since the number of chips in a timeslot is fixed, the spreading factor determines the number of symbols that can be sent in the timeslot. In particular, a timeslot can carry 704/SF symbols in the two data fields of the timeslot.

In UTRA TDD, a terminal may be assigned a dedicated traffic channel (DTCH) and a dedicated control channel (DCCH) for each of the downlink and uplink. The DTCH carries traffic data, e.g., for voice, packet data, and so on. One data frame may be sent on the DTCH in each transmission time interval (TTI), which may be 20 ms or some other duration. A data frame may also be referred to as a packet, a data codeword, a data block, and so on. The DCCH carries signaling. One control frame may be sent on the DCCH in each 40 ms interval.

Figure 4:
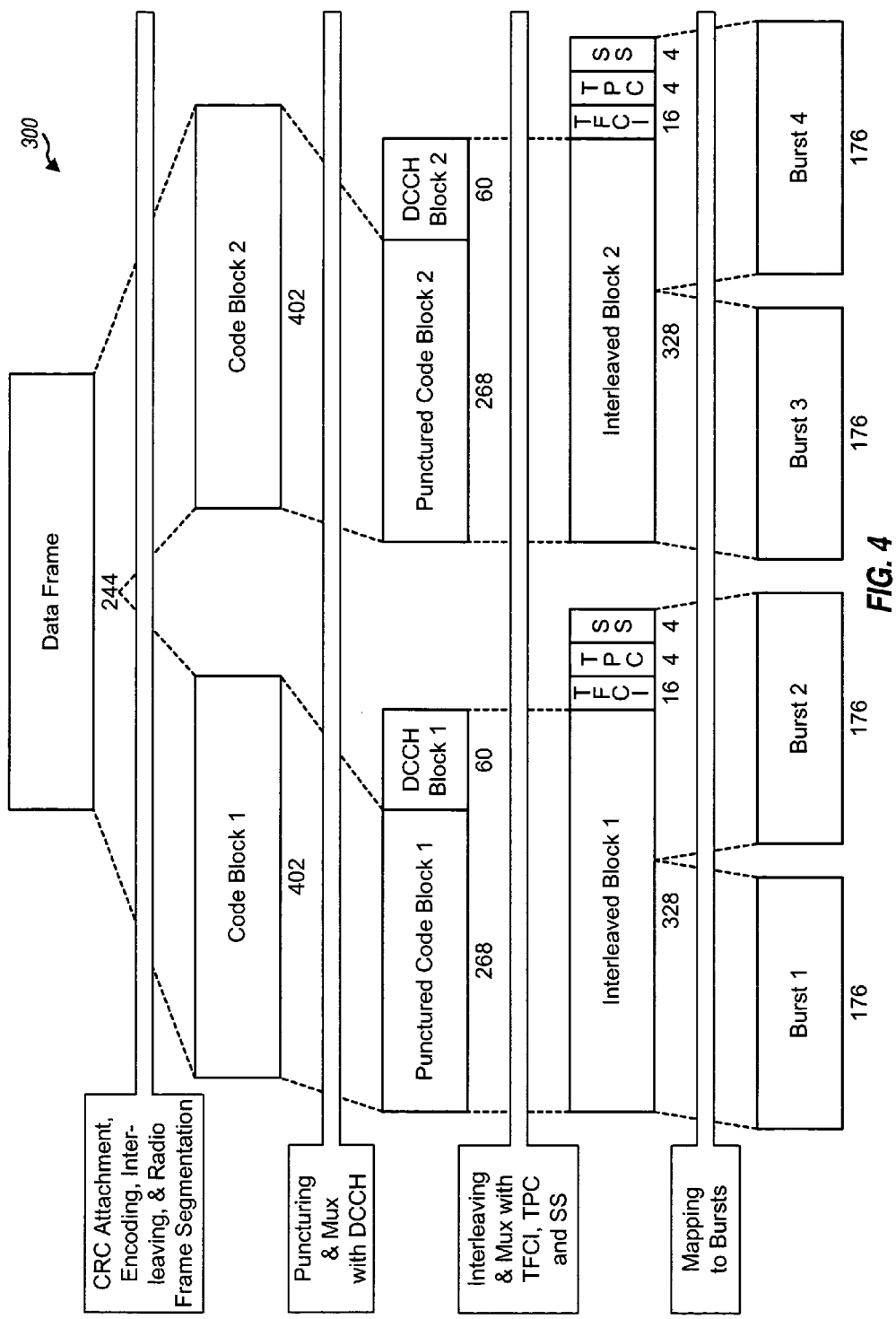
FIG. 4 shows processing of a data frame by a transmitter in UTRA TDD LCR.

FIG. 4 shows processing of a data frame by a transmitter in UTRA TDD LCR. The transmitter performs cyclic redundancy check (CRC) attachment, convolution encoding, interleaving, and radio frame segmentation on the data frame to generate two code blocks. The CRC is used by a receiver for error detection. The transmitter then performs puncturing and rate matching on each code block to obtain a punctured code block having the desired number of code bits. The transmitter multiplexes each punctured code block with a DCCH block, interleaves each set of code block and DCCH block to generate an interleaved block, and appends TFCI, TPC, and SS information to each interleaved block. The transmitter then performs slot segmentation and generates four bursts for the data frame.

The transmitter may receive traffic data at different data rates for transmission to the receiver. As an example, the transmitter may have a voice call and may receive voice frames generated by an adaptive multi-rate (AMR) speech codec at data rates ranging from 12.2 to 4.75 kilo-bits per second (kbps). The transmitter may also receive silence descriptor (SID) frames during periods of silence (e.g., pauses) and Null frames. The transmitter may process each data frame with a suitable code rate to generate the proper number of code bits for transmission in four timeslots. The transmitter may use different code rates for data frames of different data rates.

In FIG. 4, the number of bits in each block is dependent on the data rate of the data frame, whether or not the DCCH is sent, and whether or not the TFCI, TPC and SS are sent. FIG. 4 shows the number of bits in each block for a case in which the data rate is 12.2 k and the DCCH, TFCI, TPC and SS are sent with the data frame. If the DCCH, TFCI, TPC and/or SS are not sent, then the number of bits in each punctured code block increases by a corresponding number of bits since the number of bits in each burst is fixed. The code rate is determined by the number of bits in the data frame and the number of bits in the two punctured code blocks.

Each code rate is associated with a specific minimum received signal quality required to achieve a target level of performance. Received signal quality may be quantified by signal-to-interference-plus-noise ratio (SINR), signal-to-noise ratio (SNR), energy-per-symbol-to-total-noise ratio (Es/Nt), or some other measure. For clarity, SINR is used for received signal quality in much of the description below. The target level of performance may be quantified by a particular frame error rate (FER), e.g., 1% FER. Different transmit power levels may be used for data frames encoded with different code rates. For example, when the DCCH is sent, a SID frame may be transmitted with 4.5 decibel (dB) less power than a 12 k frame, and a Null frame may be transmitted with 6.4 dB less power than a 12 k frame for the same target FER.

The 12 k, SID and Null frames without DCCH may be transmitted at lower power than the 12 k, SID and Null frames with DCCH.

A TFCI index or value may be sent in each coded composite transport channel (CCTrCH) to indicate the format used for that CCTrCH. A CCTrCH is a multiplex of data for all assigned transport channels in one transmission time interval (TTI), which may be 20 ms for voice. The transmission of TFCI is configured by higher layers. Each allocated timeslot also includes higher layer signaling to indicate whether or not that timeslot carries TFCI. The TFCI is present in the first timeslot of a radio frame for each CCTrCH.

A TFCI index may include 1 to 10 information bits (or TFCI bits), which are encoded to generate a TFCI code word. The TFCI index is encoded in different manners depending on the number of TFCI bits and the selected modulation scheme. Table 1 summarizes the encoding of the TFCI index for QPSK and 8-PSK for different numbers of TFCI bits. The encoding of the TFCI is described in 3GPP TS 25.222, entitled "Multiplexing and channel coding (TDD)," Release 7, March 2006, which is publicly available. The TFCI code word may be sent with 2, 4, 8 or 16 TFCI symbols. The TFCI symbols are spread with the same Walsh code as the data symbols.

TABLE 1

| | QPSK | | 8-PSK | | |
| --- | --- | --- | --- | --- | --- |
| Number of TFCI bits | Coding/ repetition | TFCI code word size | Coding/ repetition | TFCI code word size | Number of TFCI symbols |
| 1 or 2 | 4 times (4X) repetition | 4 or 8 | 6 times (6X) repetition | 6 or 12 | 2 or 4 |
| 3 to 5 | (16, 5) block code | 16 | (32, 5) block code & puncture | 24 | 8 |
| 6 to 10 | (32, 10) block code | 32 | (64, 10) block code & puncture | 48 | 16 |

In UTRA TDD, all symbols of a timeslot are transmitted at the same power level. The coding schemes for TFCI are not as powerful as the convolutional code used for the data portion. Hence, when the transmit power is set to a lower level for a lower rate data frame, the lower transmit power may be insufficient to reliably decode the TFCI code word. The lower transmit power level may result in less reliability for TFCI. Computer simulations were performed to determine the FER of TFCI for the case without DCCH, which has lower power levels for SID and Null frames. For 4× repetition code (which is used for 1 or 2 TFCI bits with QPSK) in AWGN channel, the FER is approximately 0.5% for 12 k frames, approximately 12% for SID frames, and approximately 27% for Null frames. The FERs are even higher for the (16, 5) bi-orthogonal code and the (32, 20) Reed Muller code. The high TFCI FERs for SID and Null frames will adversely impact data performance.

The reliability of the TFCI may be improved in various manners. Several embodiments of improving the reliability of the TFCI are described below.

Figure 5A:
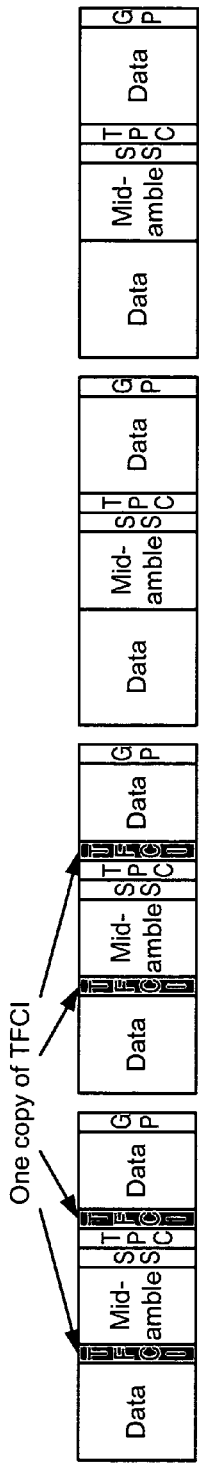
FIGS. 5A, 5B and 5C show transmission of a TFCI code word without repetition, with 2-time repetition, and with 4-time repetition, respectively.

FIG. 5A shows transmission of a TFCI code word without repetition. A data frame may be sent in four timeslots of four subframes of a TTI. The TFCI code word is partitioned into four parts, which are mapped to the first two timeslots. The last two timeslots does not include any TFCI information.

Figure 5B:
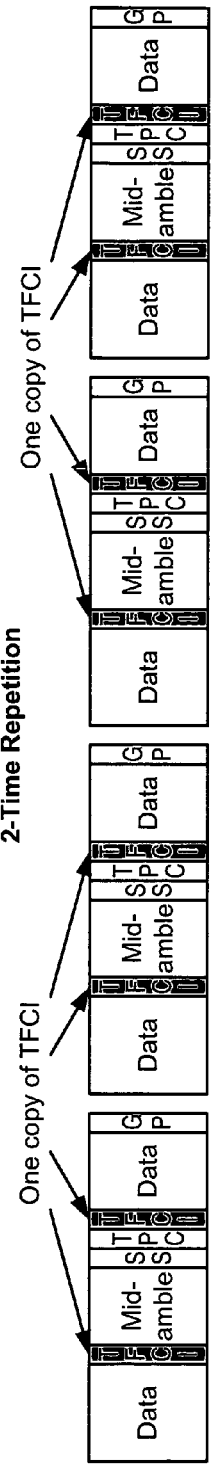

FIG. 5B shows transmission of a TFCI code word with 2-time repetition. In an embodiment, the TFCI code word is repeated twice, the first copy of the TFCI code word is sent in the first two timeslots, and the second copy of the TFCI code word is sent in the last two timeslots. In another embodiment (not shown in FIG. 5B), half of the TFCI code word is sent in the first two timeslots, and the other half of the TFCI code word is sent in the last two timeslots. Sending the TFCI code word over four timeslots may provide more time diversity.

In yet another embodiment, the first and second copies of the TFCI code word are sent in the first two timeslots. The first copy of the TFCI code word is sent using a first Walsh code, and the second copy of the TFCI code word is sent using a second Walsh code. This embodiment allows the receiver to decode the TFCI code word quicker.

Figure 5C:
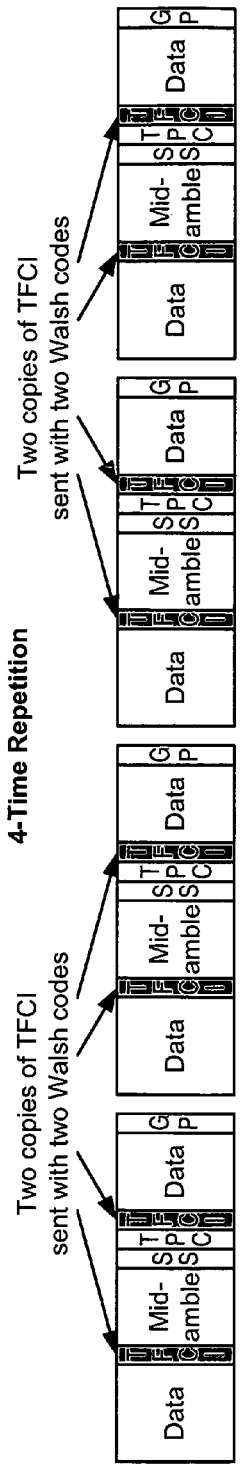

FIG. 5C shows transmission of a TFCI code word with 4-time repetition. In an embodiment, the TFCI code word is repeated four times, the first and second copies of the TFCI code word are sent in the first two timeslots using two Walsh codes, and the third and fourth copies of the TFCI code word are sent in the last two timeslots using the two Walsh codes.

In yet another embodiment, a TFCI code word is sent with sufficient transmit power for reliable reception. Depending on the data rate in a given timeslot, the transmit power used for the TFCI symbols may be equal to or higher than the transmit power used for the data symbols.

It can be shown that each doubling of the TFCI repetition factor results in approximately 3 dB improvement for the TFCI. For example, an SINR of approximately 1.3 dB may be required to achieve 1% FER for TFCI with the bi-orthogonal code in AWGN channel. The required SINR may be reduced to approximately −1.7 dB by sending a TFCI code word twice and to approximately −4.7 dB by sending a TFCI code word four times.

In an embodiment, a TFCI code word is transmitted with improved reliability only when needed. Power offsets may be determined for all supported data rates. Improved reliability (e.g., 2-time or 4-time repetition) may be used for the TFCI for certain data rates based on their power offsets. For example, improved reliability may be applied only to Null frames having the largest power offset and lowest transmit power level. Improved reliability may also be applied to SID frames and/or frames of other data rates. In another embodiment, improved reliability is applied to the TFCI for all supported data rates.

Figure 6:
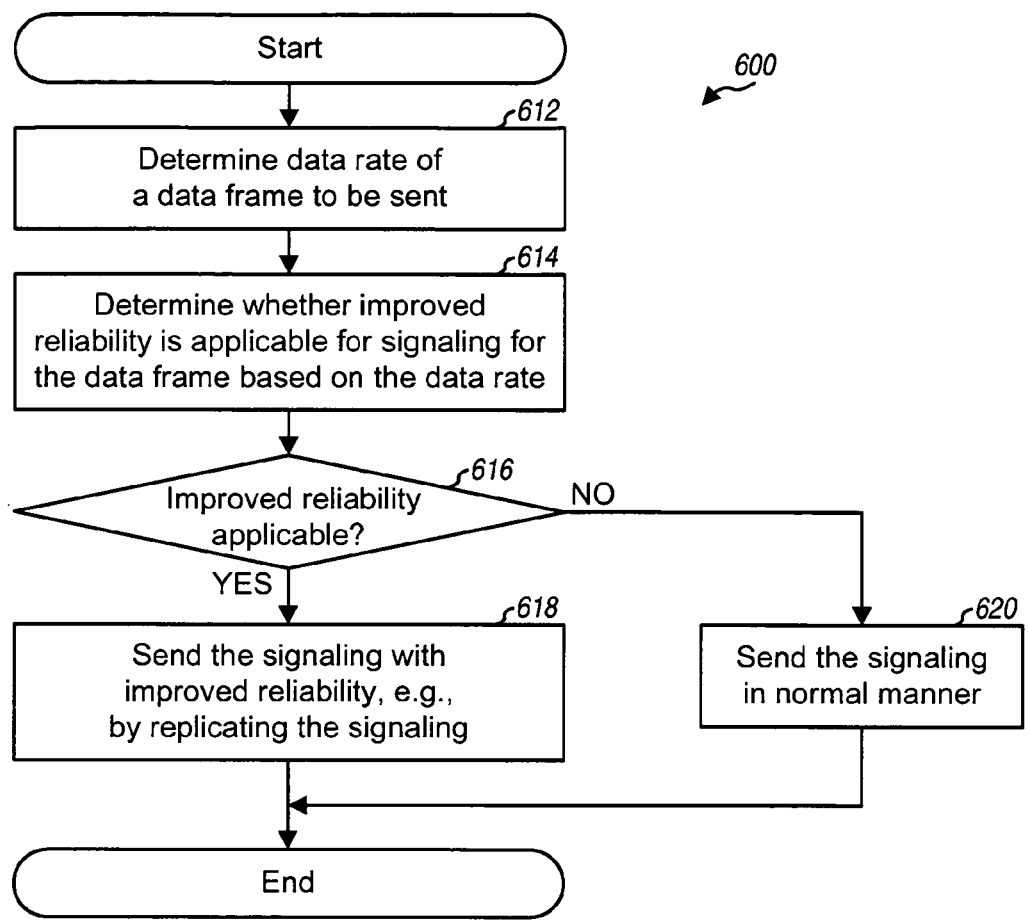
FIG. 6 shows a process for sending signaling by a transmitter.

FIG. 6 shows an embodiment of a process 600 for sending signaling, e.g., TFCI. A data frame is received for transmission, and the data rate of the data frame is determined (block 612). A determination is then made whether improved reliability is applicable for signaling (e.g., a TFCI code word) for the data frame (block 614). For example, improved reliability may be applicable if the data rate of the data frame is below a certain rate. If improved reliability is applicable, as determined in block 616, then the signaling is sent with improved reliability (block 618). This may entail replicating the signaling and sending multiple copies of the signaling. If improved reliability is not applicable, then the signaling is sent in the normal manner (block 620).

The receiver obtains all copies of a TFCI code word sent for a data frame. The receiver may combine all TFCI copies to obtain a combined TFCI for the data frame. In one embodiment, the receiver performs simple averaging and sums the TFCI copies on a symbol-by-symbol basis. In another embodiment, the receiver performs maximal ratio combining (MRC), weighs the symbols for each TFCI copy based on the received SINR of that TFCI copy, and sums the weighted symbols for all TFCI copies, symbol-by-symbol. MRC gives greater weight to TFCI copies with higher received SINRs, which may improved the quality of the combined TFCI.

The embodiments described above improve the reliability of TFCI when data is sent at variable transmit power level, e.g., due to variations in voice activity during a voice call. Computer simulations indicate that replicating a TFCI code word four times can reduce the TFCI FER to approximately 1% or better for most channel models for SID and higher rate frames. However, even replicating a TFCI code word four times may not achieve the desired reliability for the TFCI code word if sent in a Null frame, which is transmitted at very low power level. For Null frames as well as other frames, TFCI performance may be improved using the techniques described below.

In an embodiment, the reliability of TFCI is determined based on the received SINR of a data frame. The data frame may be sent in multiple timeslots. A received SINR may be determined for each timeslot, e.g., based on the midamble and/or data portion in the timeslot. The received SINRs for all timeslots may be combined to obtain the received SINR for the data frame. In an embodiment, the received SINRs for all timeslots are averaged to obtain the received SINR for the data frame. In another embodiment, the received SINR for the data frame is set to 3 dB (or 6 dB) higher than the lowest received SINR among all timeslots for 2-time (or 4-time) repetition of the TFCI.

A received TFCI code word may be deemed as reliable if the probability of decoding the TFCI code word in error is less than the target FER for the TFCI. The received TFCI code word may be decoded in the normal manner if determined to be reliable. Other actions, such as blind decoding, may be performed if the received TFCI code word is determined to be unreliable. With blind decoding, the receiver may decode a received frame based on different data rate hypotheses until the frame is decoded correctly.

In an embodiment, the reliability of a received TFCI code word is determined by comparing the received SINR of a data frame against an SINR threshold, as follows:

$$\text{Received } TFCI = \begin{cases} \text{Reliable} & \text{If Received } SINR > SINR \text{ Threshold} \\ \text{Unreliable} & \text{Otherwise.} \end{cases} \quad \text{Eq (1)}$$

In equation (1), the received TFCI code word is deemed reliable if the received SINR exceeds the SINR threshold and is deemed unreliable otherwise. The SINR threshold may be selected such that, if the received TFCI code word is deemed reliable, then the probability of decoding the TFCI code word in error is less than the target FER for TFCI. The SINR threshold may be determined in several manners.

In an embodiment, the SINR threshold is determined based on a target SINR and an SINR offset. The target SINR may be adjusted by a power control loop to achieve a desired level of performance, e.g., 1% FER for data frames. The transmitter may adjust the transmit power of data frames such that the received SINR is at or near the target SINR, as described below. The SINR offset may be determined based on the received frames.

Figure 7:
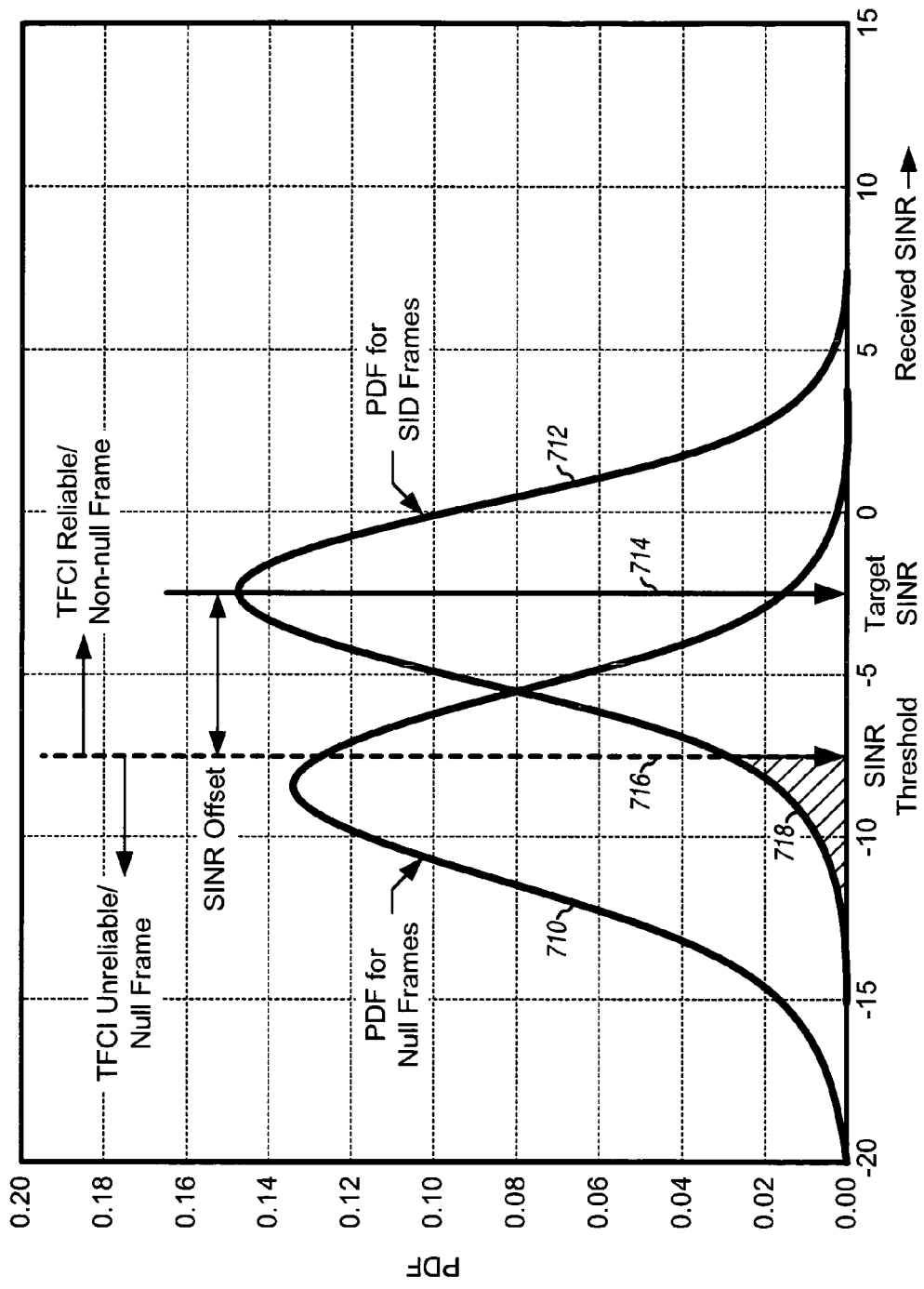
FIG. 7 shows relationship between target SINR, SINR offset, and SINR threshold.

FIG. 7 shows the relationship between the SINR threshold, target SINR, and SINR offset. A plot 710 shows a probability density function (PDF) versus received SINR for Null frames. A plot 712 shows a PDF versus received SINR for SID frames. Although not shown in FIG. 7, the PDFs versus received SINR for higher rate data frames are to the right of plot 712.

A vertical line 714 indicates the target SINR for SID frames. The transmitter may adjust the transmit power of SID frames such that the received SINRs of half the SID frames are lower than the target SINR and the received SINRs of the remaining SID frames are higher than the target SINR. Different target SINRs may be used for different data rates. These target SINRs may be separated by the coding gains achieved for the different data rates.

In the embodiment shown in FIG. 7, a vertical line 716 indicates the SINR threshold and is located between the center of the PDF for SID frames and the center of the PDF for Null frames. A received TFCI code word may be deemed as reliable if the received SINR exceeds the SINR threshold. This reliable TFCI code word may be for a SID frame, a higher rate data frame, or even a Null frame. A received TFCI code word may be deemed as unreliable if the received SINR is below the SINR threshold. This unreliable TFCI code word is deemed to be for a Null frame. In this embodiment, the determination of whether a given received TFCI code word is reliable is equivalent to determining whether a given received frame is a Null frame.

The SINR threshold may be defined to achieve the target FER for TFCI. This target FER is determined by (1) the FER for received TFCI code words deemed as reliable, which is also referred to as the conditional FER, and (2) a SID-to-Null probability, which is the percentage of SID frames with received SINRs below the SINR threshold and deemed as Null frames. The SID-to-Null probability is indicated by an area 718 with diagonal hashing under plot 712 and to the left of line 716. In order to ensure that the long-term FER can achieve the target FER for TFCI, the SINR threshold may be defined such that the conditional FER and the SID-to-Null probability are each lower than the target FER for TFCI.

In the embodiment shown in FIG. 7, the SINR offset is the difference between the target SINR for SID frames and the SINR threshold. The SINR offset maybe determined in several manners.

In a first embodiment, which is referred to as a fixed SINR offset, the SINR offset is determined based on the variance of the received SINRs for SID frames. If the PDF for SID frames is a known distribution (e.g., a Gaussian distribution), then the point at which the cumulative distribution function (CDF) is equal to a target SID-to-Null probability may be determined based on the SINR variance. The SINR offset may be defined as follows:

$$\text{SINR Offset} = K \times \sigma_{SID}, \quad \text{Eq (2)}$$

where $\sigma_{SID}^2$ is the SINR variance for SID frames, and
K is a scaling factor determined by the target SID-to-Null probability.
If the probability of SID frames is 7% and the target SID-to-Null probability is 1%, then K may be set to −1.4 for a Gaussian distribution of received SINRs.

In an embodiment, the SID SINR variance, $\sigma_{SID}^2$, is determined based on the received SINRs of SID frames. The SID frames may be identified after decoding the received TFCI code words. The received SINRs of these SID frames may be used to derive the SINR variance. In another embodiment, the SID SINR variance is determined based on the received SINRs of Null frames. Through computer simulations, it is observed that the SINR variance of Null frames is similar to the SINR variance of SID frames. Null frames may be sent much more often than SID frames, e.g., a voice call may send about 60% Null frames and about 7% SID frames. More SINR measurements may thus be available for Null frames and may be used to derive a more accurate estimate of SINR variance. A two-sided estimate of SINR variance may be derived based on received SINRs of all error-free Null frames. Alternatively, a one-sided (left-sided) estimate of SINR variance may be derived based on received SINRs that are less than the average SINR for Null frames. The one-sided estimate avoids the use of received SINRs on the right side of the Null PDF, which may be tainted with errors. In yet another embodiment, SINR variances are determined for different data rates and averaged to obtain the SINR variance for SID frames. In general, the SID SINR variance may be determined based on SID and/or other frames.

In a second embodiment, which is referred to as an adaptive SINR offset, the SINR offset is determined based on a measured SID-to-Null probability. In this embodiment, unreliable frames are initially identified as received frames deemed to be Null frames because their received SINRs are below the SINR threshold. The unreliable frames are decoded to determine whether they are actually Null frames. The SID-to-Null probability ($P_{SN}$) may be ascertained by counting the number of unreliable frames (K) not decoded as Null frames within a window of L unreliable frames, or $P_{SN}=K/L$, where L may be 200 or some other value. The SINR offset may be increased by an $OS_{UP}$ step if $P_{SN}$ exceeds a high value $P_H$, e.g., $P_H=0.02$ and $OS_{UP}=0.5$ dB. A high PSN may be due to too many SID frames being declared as Null frames because of a low SINR offset. Increasing the SINR offset by $OS_{UP}$ would then reduce such error events. Conversely, the SINR offset may be decreased by an $OS_{DN}$ step if $P_{SN}$ falls below a low value $P_L$, e.g., $P_L=0.005$ and $OS_{DN}=0.5$ dB. A low PSN may be due to few SID frames being declared as Null frames because of a large SINR offset. Decreasing the SINR offset by $OS_{DN}$ would then induce more SID frames to be declared as Null frames. Other values may also be used for $P_L$, $P_H$, $OS_{UP}$ and $OS_{DN}$. After each adjustment of the SINR offset, a wait period (e.g., of 250 unreliable frames) may be applied during which the SINR offset is not changed. This wait period may prevent toggling of the SINR offset.

The SINR offset may be constrained to be within a predetermined range to prevent over and under adjustment. The predetermined range may be determined by computer simulations, empirical measurements, and so on, and may be dependent on channel model. The predetermined range may be from −4 to −8 dB or some other range.

The second embodiment may be used for various channel models and can adapt to different channel conditions. The second embodiment does not require an estimate of SINR variance and may be used if the SINR variance is not available or is too noisy. The second embodiment may be used to adjust the SINR offset, as described above, or to adjust the SINR threshold directly.

For both embodiments, the SINR threshold may be set as follows:

$$\text{SINR Threshold} = \text{Target SINR} - \text{SINR Offset.} \quad \text{Eq (3)}$$

The target SINR is adjusted by the power control loop to achieve the target FER for data frames. Since the transmit power is adjusted based on the target SINR, the distribution of received SINRs also varies with the target SINR. Since the SINR threshold is adjusted along with the target SINR, the FER for TFCI will track the target FER for data frames.

Computer simulations were performed for the first embodiment in which the SINR offset is determined based on SINR variance. The computer simulations indicate that the FER for TFCI may be reduced substantially for various channel models, e.g., from about 20% to less than 1% for some channel models.

Figure 8:
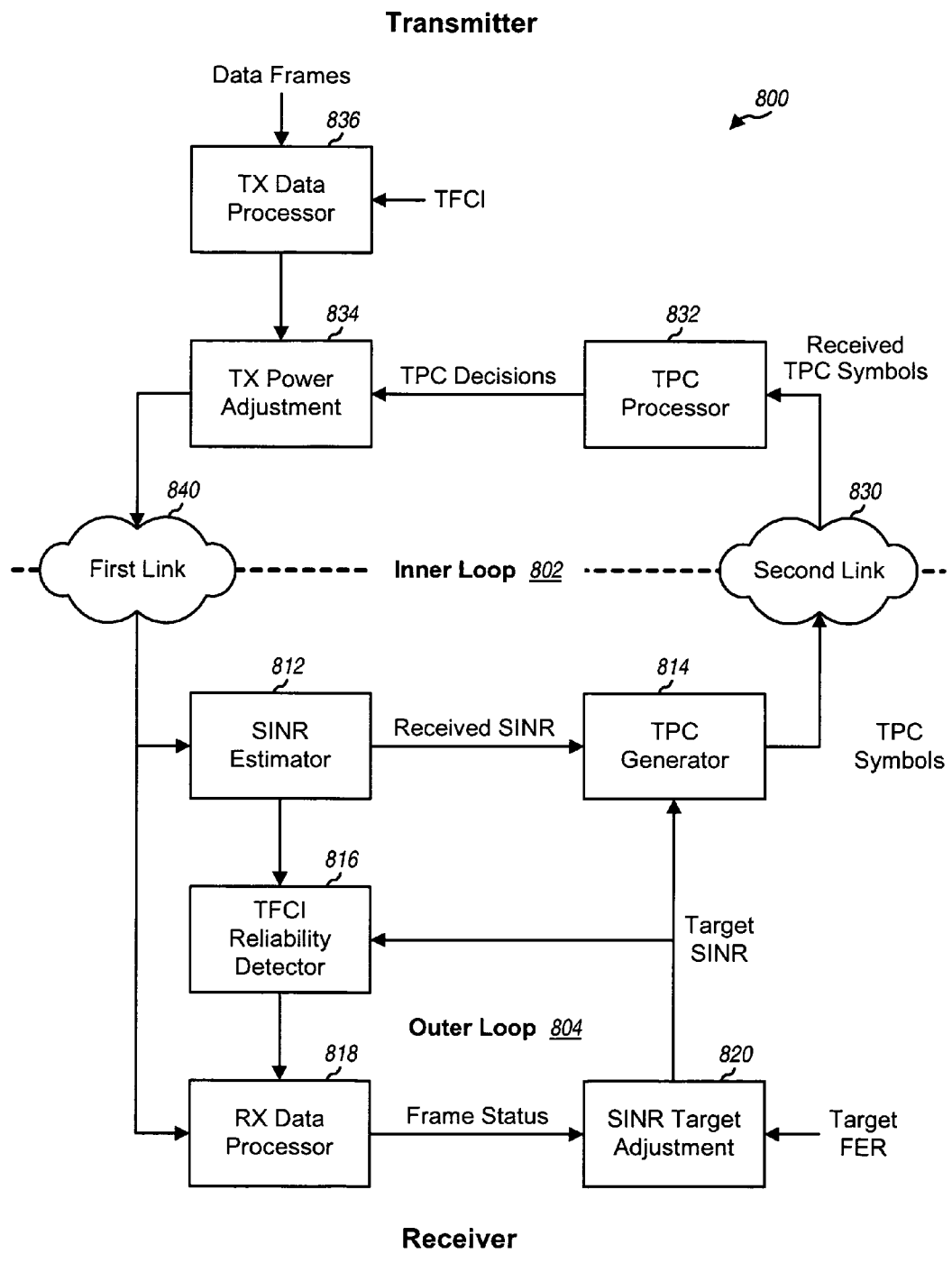
FIG. 8 shows a power control mechanism.

FIG. 8 shows a power control mechanism 800 that adjusts the transmit power of a data transmission from the transmitter to the receiver. Power control mechanism 800 includes an inner loop 802 and an outer loop 804.

Inner loop 802 attempts to maintain the received SINR for the data transmission as close as possible to the target SINR. In each allocated timeslot, an SINR estimator 812 estimates the received SINR of the data transmission and provides the received SINR to a TPC generator 814. TPC generator 814 also receives the target SINR from an adjustment unit 820, compares the received SINR against the target SINR, and generates a TPC symbol based on the comparison result. The TPC symbol is sent via a link 830 to the transmitter. The transmitter processes the feedback transmission from the receiver and obtains a received TPC symbol in each allocated timeslot. A TPC detector 832 detects each received TPC symbol and provides a TPC decision, which indicates whether an Up command or a Down command was detected. A transmitter unit 834 then adjusts the transmit power for the data transmission based on the TPC decision.

Due to path loss and fading on a link 840, which typically vary over time and especially for a mobile transmitter and/or receiver, the received SINR at the receiver continually fluctuates. Inner loop 802 attempts to maintain the received SINR at or near the target SINR in the presence of changes in link 840.

Outer loop 804 continually adjusts the target SINR such that the target FER is achieved for the data transmission. A transmit (TX) data processor 836 receives and processes data frames for transmission via link 840. TX data processor 836 also sends a TFCI code word with each data frame. A TFCI reliability detector 816 determines the reliability of the TFCI code word for each received frame, as described below. A receive (RX) data processor 818 processes the data transmission and decodes the received frames. RX data processor 818 further checks each decoded frame, determines whether the frame was decoded correctly (good) or in error (erased), and provides the status of each decoded frame. Adjustment unit 820 receives the frame status and the target FER and determines the target SINR. Adjustment unit 820 may decrease the target SINR by a ΔDN step for each frame decoded correctly (or good frame) and increase the target SINR by a ΔUP step for each frame decoded in error (or good frame). The ΔUP and ΔDN steps may be selected based on the target FER and the desired rate of convergence for the outer loop.

Figure 9:
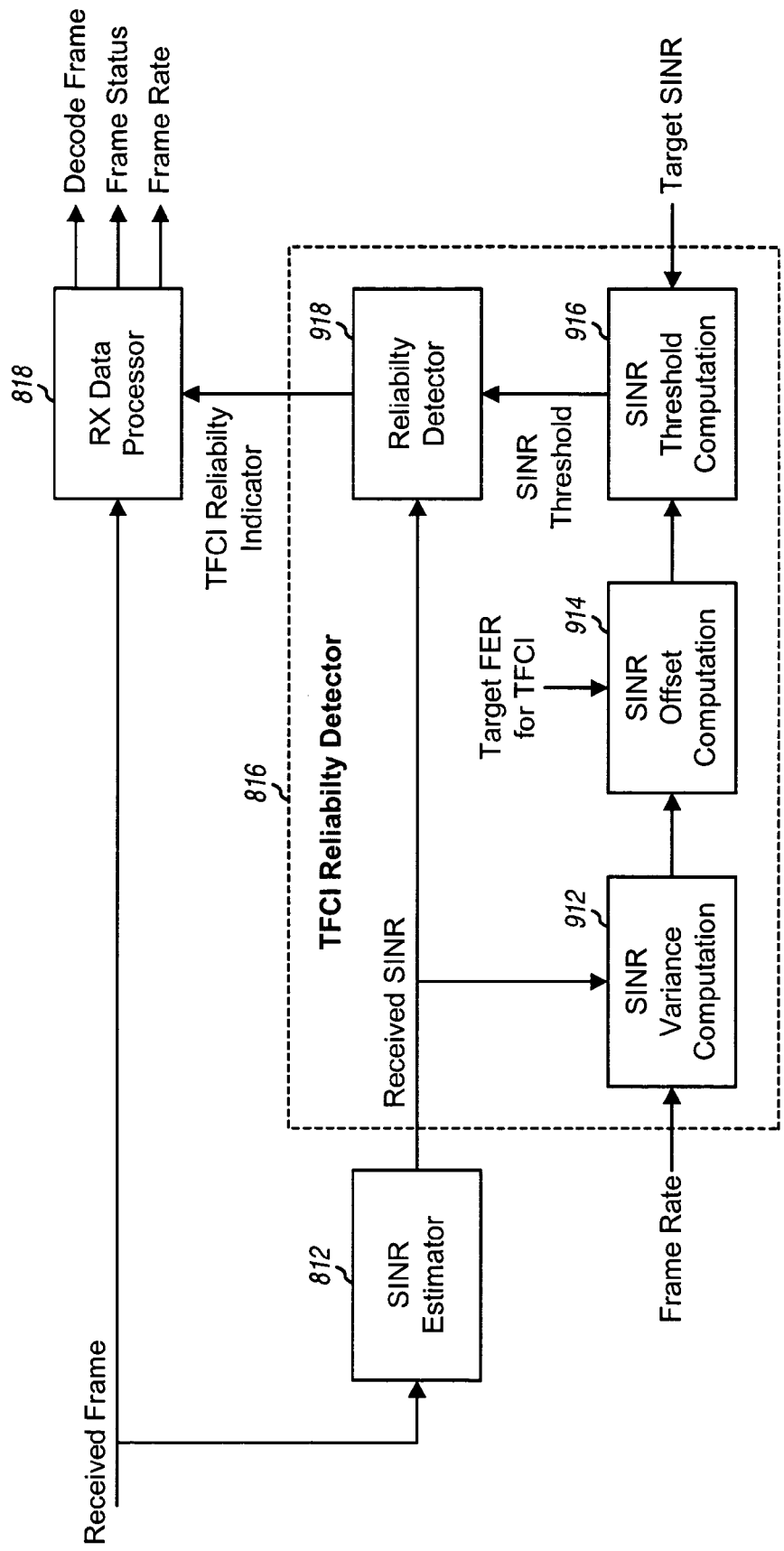
FIG. 9 shows a TFCI reliability detector.

FIG. 9 shows an embodiment of TFCI reliability detector 816 in FIG. 8. For clarity, the processing for one received frame is described below. Within detector 816, an SINR variance computation unit 912 obtains the received SINR as well as the data rate of the received frame. Unit 912 may store the received SINR until the data rate of the received frame is determined. Unit 912 may then update the SINR variance with the received SINR if the received frame is of the data rate being considered, e.g., Null rate. An SINR offset computation unit 914 receives the SINR variance from unit 912 and possibly a target FER for TFCI. Unit 914 computes the SINR offset, e.g., as shown in equation (2), where the scaling factor K is dependent on the target FER for TFCI. An SINR threshold computation unit 916 receives the target SINR and the SINR offset and computes the SINR threshold, e.g., as shown in equation (3). A reliability detector 918 obtains the received SINR and the SINR threshold, compares the received SINR against the SINR threshold, and declares the received TFCI code word as either reliable or unreliable based on the comparison result, e.g., as shown in equation (1). Detector 918 provides a TFCI reliability indicator. If the received TFCI code word is deemed reliable, then RX data processor 818 decodes the received TFCI code word and then decodes the received frame in accordance with the decoded TFCI. If the received TFCI code word is deemed unreliable, then RX data processor 818 may declare the received frame as a Null frame or may perform blind detection and decode the received frame in accordance with each possible data rate until the frame is decoded correctly or all data rates have been attempted. RX data processor 818 provides the decoded frame, the frame status (which may be used to update the target SINR), and the frame rate (which may be used to update the SINR variance).

Figure 10:
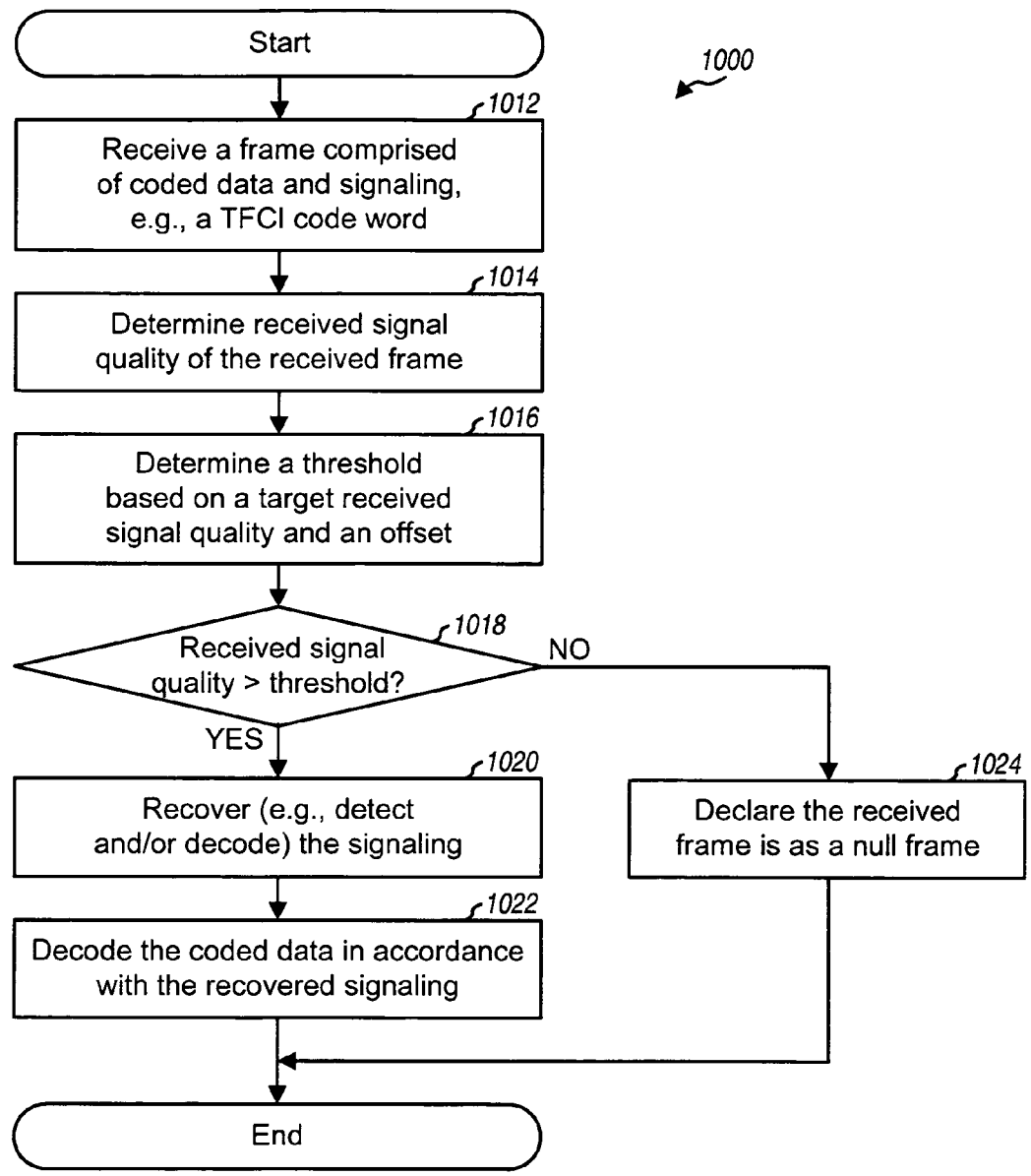
FIG. 10 shows a process for processing data by a receiver.

FIG. 10 shows an embodiment of a process 1000 for processing data at the receiver. A frame comprised of coded data and signaling (e.g., a TFCI code word) is received (block 1012). The received signal quality (e.g., received SINR) of the received frame is determined (block 1014). A threshold is determined based on a target received signal quality and an offset (block 1016). The target received signal quality may be adjusted to achieve a target FER for received frames. The offset may be determined based on any of the embodiments described above. A determination is made whether the received signal quality is greater than the threshold (block 1018). If the answer is 'Yes', then the signaling (e.g., received TFCI code word) is recovered, e.g., detected and/or decoded (block 1020). The coded data in the received frame is then decoded in accordance with the recovered signaling (block 1022). Otherwise, if the answer is 'No' for block 1018, then the received frame is declared as a null frame (block 1024).

The techniques described herein may be used for the downlink and uplink. A base station may perform process 600 in FIG. 6 to send signaling (e.g., TFCI) on the downlink and may perform process 1000 in FIG. 10 to receive signaling on the uplink. A terminal may perform process 600 in FIG. 6 to send signaling on the uplink and may perform process 1000 in FIG. 10 to receive signaling on the downlink. The techniques may also be used for various types of signaling such as TFCI, channel quality indicator (CQI), rate information, Layer 1 (L1) and Layer 2 (L2) control signaling, and so on.

Figure 11:
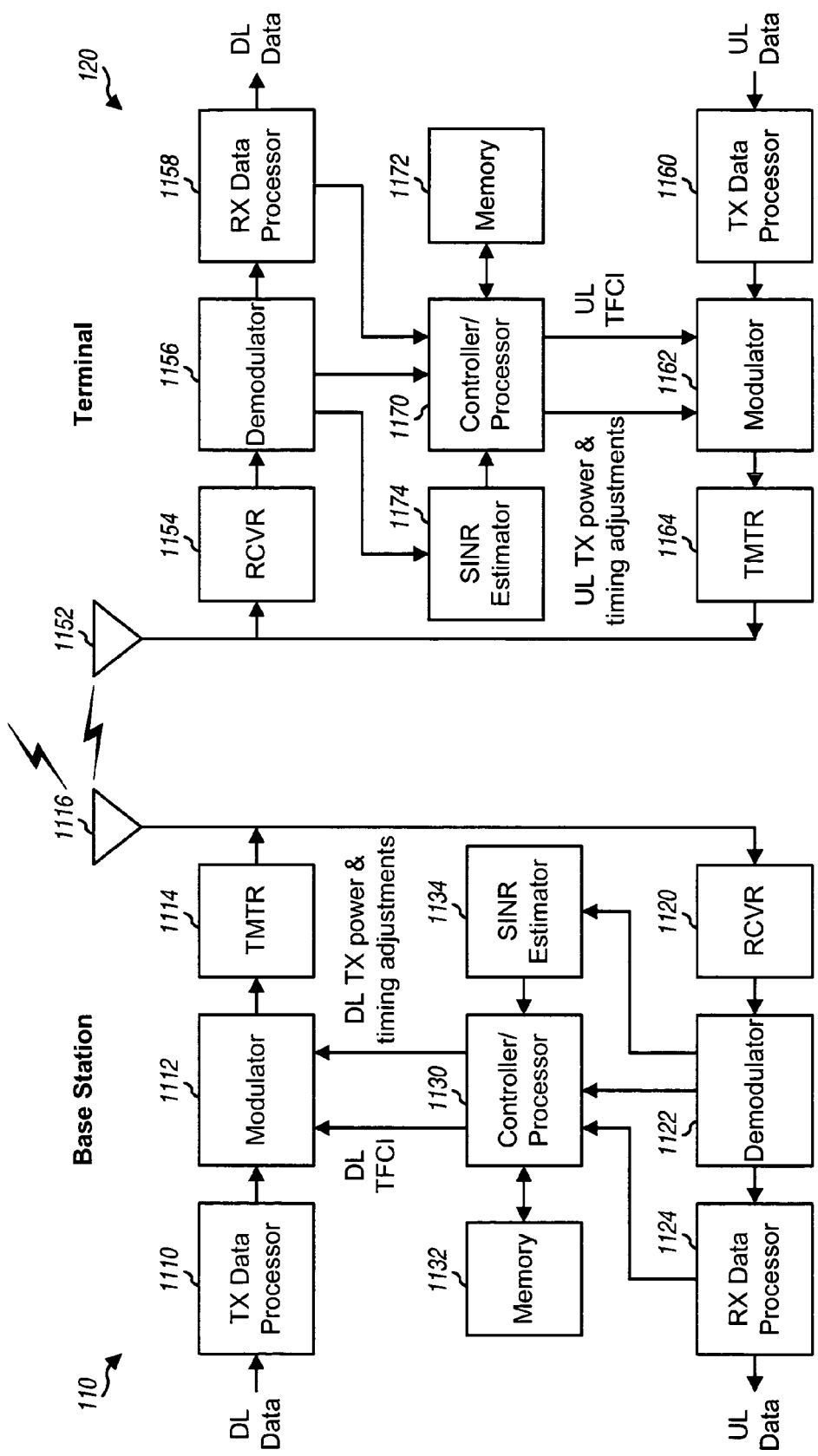
FIG. 11 shows a block diagram of a base station and a terminal.

FIG. 11 shows a block diagram of a base station 110 and a terminal 120, which are one of the base stations and one of the terminals in FIG. 1. At base station 110, a TX data processor 1110 receives data frames (e.g., for the DTCH) and control frames (e.g., for the DCCH), processes (e.g., encodes and interleaves) each frame, and provides coded data. A modulator 1112 processes the coded data to generate data symbols, processes signaling and Layer 1 information (e.g., TFCI, TPC and SS) to generate signaling symbols, and provides bursts of data and signaling symbols. For UTRA TDD, the processing by modulator 1112 may include spreading the data and signaling symbols with one or more Walsh codes and scrambling the spread symbols with a scrambling code. A transmitter (TMTR) 1114 then processes the bursts to generate a downlink signal, which is transmitted from an antenna 1116 to the terminals.

At terminal 120, an antenna 1152 receives the downlink signal from base station 110 and provides a received signal to a receiver (RCVR) 1154. Receiver 1154 conditions and digitizes the received signal and provides samples. A demodulator 1156 then processes (e.g., descrambles and despreads) the samples to obtain received symbols. An RX data processor 1158 decodes the received symbols for each data frame sent to terminal 120 and provides decoded data. RX data processor 1158 further provides the status of each decoded frame (e.g., good or erased) to a controller 1170.

The processing for uplink transmission may be similar to the processing for the downlink transmission. The downlink and uplink processing for UTRA TDD is described in documents 3GPP TS 25.221 and TS 25.222. Controllers 1130 and 1170 direct the operations at base station 110 and terminal 120, respectively. Memories 1132 and 1172 store data and program codes for base station 110 and terminal 120, respectively.

For signaling transmission, controller 1130 and/or 1170 may perform process 600 in FIG. 6 and determine whether to send signaling with improved reliability. For downlink signaling detection, an SINR estimator 1174 at terminal 120 may estimate the received SINR of each received frame. Controller 1170 at terminal 120 may implement process 1000 in FIG. 10 and/or other processes to detect signaling (e.g., TFCI) received from base station 110. For uplink signaling detection, an SINR estimator 1134 at base station 110 may estimate the received SINR of each received frame. Controller 1130 at base station 110 may implement process 1000 in FIG. 10 and/or other processes to detect signaling (e.g., TFCI) received from terminal 120.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An apparatus comprising:
at least one processor to receive a frame comprising coded data and signaling, the signaling differently coded from the coded data, the signaling coded with improved transmitted reliability separate from a concurrently transmitted reliability of the coded data, to determine received signal quality of the received frame, to determine whether the signaling is reliable based on the received signal quality, a frame rate of the frame, and a target frame error rate for the signaling, and if the signaling is deemed reliable, to recover the signaling and decode the coded data in accordance with the recovered signaling; and
a memory coupled to the at least one processor.

2. The apparatus of claim 1, wherein the at least one processor declares the received frame as a null frame if the signaling is deemed not reliable.

3. The apparatus of claim 1, wherein the at least one processor determines a threshold based on a target received signal quality and an offset, and determines whether the signaling is reliable based on the received signal quality and the threshold.

4. The apparatus of claim 3, wherein the at least one processor adjusts the target received signal quality based on decoding status of the received frame.

5. The apparatus of claim 3, wherein the at least one processor estimates variance of the received signal quality and determines the offset based on the variance of the received signal quality.

6. The apparatus of claim 5, wherein the at least one processor estimates the variance of the received signal quality based on null frames.

7. The apparatus of claim 5, wherein the at least one processor determines the offset further based on a target error rate for the signaling.

8. The apparatus of claim 3, wherein the at least one processor determines a detection error rate indicative of error in declaring the signaling as reliable or unreliable based on the received signal quality, and adjusts the offset based on the detection error rate.

9. The apparatus of claim 8, wherein the at least one processor increases the offset if the detection error rate exceeds a first value and decreases the offset if the detection error rate falls below a second value.

10. The apparatus of claim 8, wherein the at least one processor maintains the offset for a particular number of frames after adjusting the offset.

11. The apparatus of claim 1, wherein the at least one processor receives multiple bursts for the received frame, determines received signal quality of each burst, and determines the received signal quality of the received frame based on received signal qualities of the multiple bursts.

12. The apparatus of claim 1, wherein the at least one processor receives multiple bursts for the received frame, obtains the coded data from a first set of fields in each of the multiple bursts, and obtains the signaling from a second set of fields in each of the multiple bursts.

13. The apparatus of claim 1, wherein the signaling comprises transport format combination indicator (TFCI).

14. A method comprising:
receiving at a receiver a frame comprising coded data and signaling, the signaling differently coded from the coded data, the signaling coded with improved transmitted reliability separate from a concurrently transmitted reliability of the coded data;
determining received signal quality of the received frame;
determining whether the signaling is reliable based on the received signal quality, a frame rate of the frame, and a target frame error rate for the signaling; and
if the signaling is deemed reliable, recovering the signaling, and
decoding the coded data in accordance with the recovered signaling.

15. The method of claim 14, wherein the determining whether the signaling is reliable comprises
determining a threshold based on a target received signal quality and an offset, and
determining whether the signaling is reliable based on the received signal quality and the threshold.

16. The method of claim 15, further comprising:
estimating variance of the received signal quality; and
determining the offset based on the variance of the received signal quality.

17. The method of claim 15, further comprising:
determining a detection error rate indicative of error in declaring the signaling as reliable or unreliable based on the received signal quality; and
adjusting the offset based on the detection error rate.

18. An apparatus comprising:
means for receiving a frame comprising coded data and signaling, the signaling differently coded from the coded data, the signaling coded with improved transmitted reliability separate from a concurrently transmitted reliability of the coded data;
means for determining received signal quality of the received frame;
means for determining whether the signaling is reliable based on the received signal quality, a frame rate of the frame, and a target frame error rate for the signaling;
means for recovering the signaling if deemed reliable; and
means for decoding the coded data in accordance with the recovered signaling if the signaling is deemed reliable.

19. The apparatus of claim 18, wherein the means for determining whether the signaling is reliable comprises
means for determining a threshold based on a target received signal quality and an offset, and
means for determining whether the signaling is reliable based on the received signal quality and the threshold.

20. The apparatus of claim 19, further comprising:
means for estimating variance of the received signal quality; and
means for determining the offset based on the variance of the received signal quality.

21. The apparatus of claim 19, further comprising:
means for determining a detection error rate indicative of error in declaring the signaling as reliable or unreliable based on the received signal quality; and
means for adjusting the offset based on the detection error rate.

22. A non-transitory processor readable media including processor-executable instructions encoded thereon for causing a processor to:
receive a frame comprising coded data and signaling, the signaling differently coded from the coded data, the signaling coded with improved transmitted reliability separate from a concurrently transmitted reliability of the coded data;
determine received signal quality of the received frame;
determine whether the signaling is reliable based on the received signal quality, a frame rate of the frame, and a target frame error rate for the signaling; and
if the signaling is deemed reliable, recover the signaling, and
decode the coded data in accordance with the recovered signaling.

23. The non-transitory processor readable media of claim 22, and further for storing instructions operable to:
determine a threshold based on a target received signal quality and an offset, and
determine whether the signaling is reliable based on the received signal quality and the threshold.

24. The non-transitory processor readable media of claim 23, and further for storing instructions operable to:
estimate variance of the received signal quality; and
determine the offset based on the variance of the received signal quality.

25. The non-transitory processor readable media of claim 23, and further for storing instructions operable to:
determine a detection error rate indicative of error in declaring the signaling as reliable or unreliable based on the received signal quality; and
adjust the offset based on the detection error rate.

26. An apparatus comprising:
at least one processor to determine if improved reliability is applicable for signaling for a data frame comprising coded data and the signaling based at least partially on a data rate and transmit power level of the data frame, to send the signaling without improved reliability if deemed not applicable, and to send the signaling, the signaling differently coded from the coded data, the signaling coded with improved transmitted reliability separate from a concurrently transmitted reliability of the coded data if deemed applicable; and
a memory coupled to the at least one processor.

27. The apparatus of claim 26, wherein the at least one processor determines a data rate of the data frame and determines if improved reliability is applicable for the signaling based on the data rate.

28. The apparatus of claim 26, wherein the at least one processor replicates the signaling to obtain multiple copies of the signaling and sends the multiple copies of the signaling to improve reliability.

29. The apparatus of claim 26, wherein the at least one processor replicates the signaling to obtain two copies of the signaling and sends the two copies of the signaling in multiple timeslots for the data frame.

30. The apparatus of claim 26, wherein the at least one processor replicates the signaling to obtain four copies of the signaling and sends the four copies of the signaling in four timeslots using two Walsh codes.

31. The apparatus of claim 26, wherein the at least one processor maps data for the data frame to a first set of fields in each of multiple bursts, maps the signaling to a second set of fields in each of the multiple bursts, and sends symbols in each burst at equal transmit power level, wherein the first set of fields is time division multiplexed with the second set of fields in each burst.

32. A method comprising:
determining if improved reliability is applicable for signaling for a data frame comprising coded data and the signaling based at least partially on a data rate and transmit power level of the data frame;
sending at a transmitter the signaling without improved reliability if deemed not applicable; and
sending at the transmitter the signaling, the signaling differently coded from the coded data, the signaling coded with improved transmitted reliability separate from a concurrently transmitted reliability of the coded data if deemed applicable.

33. The method of claim 32, wherein the determining if improved reliability is applicable for the signaling comprises
determining a data rate of the data frame, and
determining if improved reliability is applicable for the signaling based on the data rate.

34. The method of claim 32, wherein the sending the signaling with improved reliability comprises
replicating the signaling to obtain multiple copies of the signaling, and
sending the multiple copies of the signaling to improve reliability.

35. An apparatus comprising:
means for determining if improved reliability is applicable for signaling for a data frame comprising coded data and the signaling based at least partially on a data rate and transmit power level of the data frame;
means for sending the signaling without improved reliability if deemed not applicable: and
means for sending the signaling, the signaling differently coded from the coded data, the signaling coded with improved transmitted reliability separate from a concurrently transmitted reliability of the coded data if deemed applicable.

36. The apparatus of claim 35, wherein the means for determining if improved reliability is applicable for the signaling comprises
means for determining a data rate of the data frame, and
means for determining if improved reliability is applicable for the signaling based on the data rate.

37. The apparatus of claim 35, wherein the means for sending the signaling with improved reliability comprises
means for replicating the signaling to obtain multiple copies of the signaling, and
means for sending the multiple copies of the signaling to improve reliability.

\* \* \* \* \*